United States Patent
Tajima

(10) Patent No.: US 9,654,006 B2
(45) Date of Patent: May 16, 2017

(54) SEMICONDUCTOR DEVICE AND CONTROL METHOD THEREOF

(71) Applicant: Renesas Electronics Corporation, Tokyo (JP)

(72) Inventor: Hideyuki Tajima, Tokyo (JP)

(73) Assignee: Renesas Electronics Corporation, Koutou-ku, Tokyo (JP)

( * ) Notice: Subject to any disclaimer, the term of this patent is extended or adjusted under 35 U.S.C. 154(b) by 0 days.

(21) Appl. No.: 14/991,399

(22) Filed: Jan. 8, 2016

(65) Prior Publication Data
US 2016/0248325 A1  Aug. 25, 2016

(30) Foreign Application Priority Data
Feb. 24, 2015  (JP) .................................. 2015-033926

(51) Int. Cl.
*H02M 3/158* (2006.01)
*H02M 1/00* (2006.01)

(52) U.S. Cl.
CPC .. *H02M 3/1582* (2013.01); *H02M 2001/0025* (2013.01)

(58) Field of Classification Search
CPC ......... H02M 3/156; H02M 2003/1566; H02M 3/1582; H02M 2001/0009; H02M 2001/0016; H02M 2001/0019
See application file for complete search history.

(56) References Cited

U.S. PATENT DOCUMENTS

| | | | | |
|---|---|---|---|---|
| 7,804,282 B2 * | 9/2010 | Bertele | ............... | H02M 3/1582 323/222 |
| 8,901,843 B2 * | 12/2014 | Jin | ..................... | H05B 33/0815 315/205 |
| 2010/0131219 A1 * | 5/2010 | Kenly | ................ | G01R 19/0092 702/64 |
| 2015/0214827 A1 * | 7/2015 | Yoon | ................... | H02M 3/1588 323/286 |

OTHER PUBLICATIONS

Linear Technology Corporation [online] [Searched on Jan. 15, 2015] Internet <URL:http://cds.linear.com/docs/en/datasheet/3129fb.pdf>, 30 pages.
Texas Instruments Incorporated [online] [Searched on Jan. 15, 2015] Internet <URL:http://www.ti.com/lit/ds/symlink/tps63060.pdf>, 30 pages.

* cited by examiner

*Primary Examiner* — Jessica Han
(74) *Attorney, Agent, or Firm* — Sughrue Mion, PLLC

(57) ABSTRACT

According to one embodiment, a DC-DC converter 1 includes a power supply unit 12 that includes an inductor L1 and a switching unit and generates an output voltage Vout corresponding to a duty of a pulse signal P1, a PID controller 111 that outputs a control signal S corresponding to a difference between a divided voltage of Vout and a target voltage Vcnst, a PI controller 112 that outputs a control signal D corresponding to a difference between the control signal S and an average current flowing through the inductor L1, a PWM generation unit 113 that generates the pulse signal P1 with a duty ratio corresponding to the control signal D, and in step-down mode, the PI controller 112 performs proportional control of the differential signal ei by using a product of the control signal D and a reference proportionality constant KP as a proportionality constant.

10 Claims, 4 Drawing Sheets

SEMICONDUCTOR DEVICE AND CONTROL METHOD THEREOF

CROSS-REFERENCE TO RELATED APPLICATIONS

This application is based upon and claims the benefit of priority from Japanese patent application No. 2015-033926, filed on Feb. 24, 2015, the disclosure of which is incorporated herein in its entirety by reference.

BACKGROUND

The present invention relates to a semiconductor device and a control method thereof and, for example, relates to a semiconductor device and a control method thereof suitable for generating a stable output voltage.

The step-up/step-down power supply disclosed in Linear Technology Corporation [online] [Searched on Jan. 15, 2015] Internet <URL:http://cds.linear.com/docs/en/datasheet/3129fb.pdf> and Texas Instruments Incorporated [online] [Searched on Jan. 15, 2015] Internet <URL:http://www.ti.com/lit/ds/symlink/tps63060.pdf> employs average current mode control, which is one way of output voltage control. The step-up/step-down power supply that employs this control method includes a voltage loop for feedback control of an output voltage and a current loop for feedback control of an average current flowing through an inductor. The voltage loop is used mainly to suppress variation of an output voltage due to a load connected to an output terminal. The current loop is used mainly to suppress variation of an output voltage due to variation of an input voltage.

SUMMARY

In the configuration disclosed in the above-described related art, a current flowing through the inductor is proportional to the input voltage in step-down mode, which is, when input voltage≥output voltage is satisfied. Accordingly, the bandwidth of the current loop for feedback control of a current flowing through the inductor is also proportional to the input voltage. Therefore, while the bandwidth of the current loop is large when the input voltage is high, the bandwidth of the current loop becomes smaller as the input voltage becomes lower. Thus, in this configuration, it is difficult to achieve the large bandwidth of the current loop all over the range of the input voltage. Note that, when the bandwidth of the current loop is small, variation of the output voltage due to variation of the input voltage increases, which causes the output voltage to be unstable.

The other problems and novel features of the present invention will become apparent from the description of the specification and the accompanying drawings.

According to one embodiment, a semiconductor device includes a power supply unit that includes an inductor and a switching unit turning on and off under control by a pulse signal to control a current flowing through the inductor, and generates an output voltage by changing an input voltage by an amount of voltage corresponding to a duty ratio of the pulse signal, a first control unit that performs PI control of a first differential signal being a difference between a comparison voltage corresponding to the output voltage and a target voltage and outputs a first control signal, a second control unit that performs PI control of a second differential signal being a difference between the first control signal and a current signal indicating an average value of the current flowing through the inductor and outputs a second control signal, and a PWM generation unit that generates the pulse signal with a duty ratio corresponding to the second control signal, wherein, in step-down mode, the second control unit performs proportional control of the second differential signal by using a multiplication result or multiplying the second control signal by a reference proportionality constant as a proportionality constant.

According to one embodiment, a control method of semiconductor device is a control method of a semiconductor device that controls a current flowing through an inductor by a pulse signal and thereby generates an output voltage by changing an input voltage by an amount of voltage corresponding to a duty ratio of the pulse signal, and the method includes performing PI control of a first differential signal being a difference between a comparison voltage corresponding to the output voltage and a target voltage and outputting a first control signal, in step-down mode, performing proportional control of a second differential signal being a difference between the first control signal and a current signal indicating an average value of the current flowing through the inductor by using a multiplication result of multiplying a second control signal by a reference proportionality constant as a proportionality constant, and performing integral control of the second differential signal and outputting the second control signal, and generating the pulse signal with a duty ratio corresponding to the second control signal.

According to the above-described embodiment, it is possible to provide a semiconductor device capable of generating a stable output voltage without depending on the level of an input voltage.

BRIEF DESCRIPTION OF THE DRAWINGS

The above and other aspects, advantages and features will be more apparent from the following description of certain embodiments taken in conjunction with the accompanying drawings, in which.

DETAILED DESCRIPTION

Embodiments of the present invention are described hereinafter with reference to the drawings. It should be noted that the drawings are given in simplified form by way of illustration only, and thus are not to be considered as limiting the present invention. The same elements are denoted by the same reference symbols, and the redundant explanation is omitted.

In the following embodiments, the description will be divided into a plurality of sections or embodiments when necessary for the sake of convenience. However, unless explicitly specified otherwise, those sections or embodiments are by no means unrelated to each other, but are in such a relation that one represents a modification, a detailed or supplementary description, etc. of part or whole of the other. Further, in the following embodiments, when a reference is made to the number etc, (including the number, numeric value, quantity, range, etc.) of elements, except in such cases where it is explicitly specified otherwise or the number is obviously limited to a specific number in principle, the number is not limited to the specific number but may be greater or less than the specific number.

It is needless to mention that, in the following embodiments, their constituent elements (including operation steps) are not necessarily essential, except in such cases where it is explicitly specified otherwise or they are obviously considered to be essential in principle. Likewise, in the following embodiments, when a reference is made to the shape, relative position, etc. of a constituent element or the like, this includes those shapes etc. substantially resembling or similar to that shape etc., except in such cases where it is explicitly specified otherwise or it is obviously considered otherwise in principle. The same applies to the number etc, (including the number, numeric value, quantity, range, etc.) mentioned above.

First Embodiment

Figure 1:
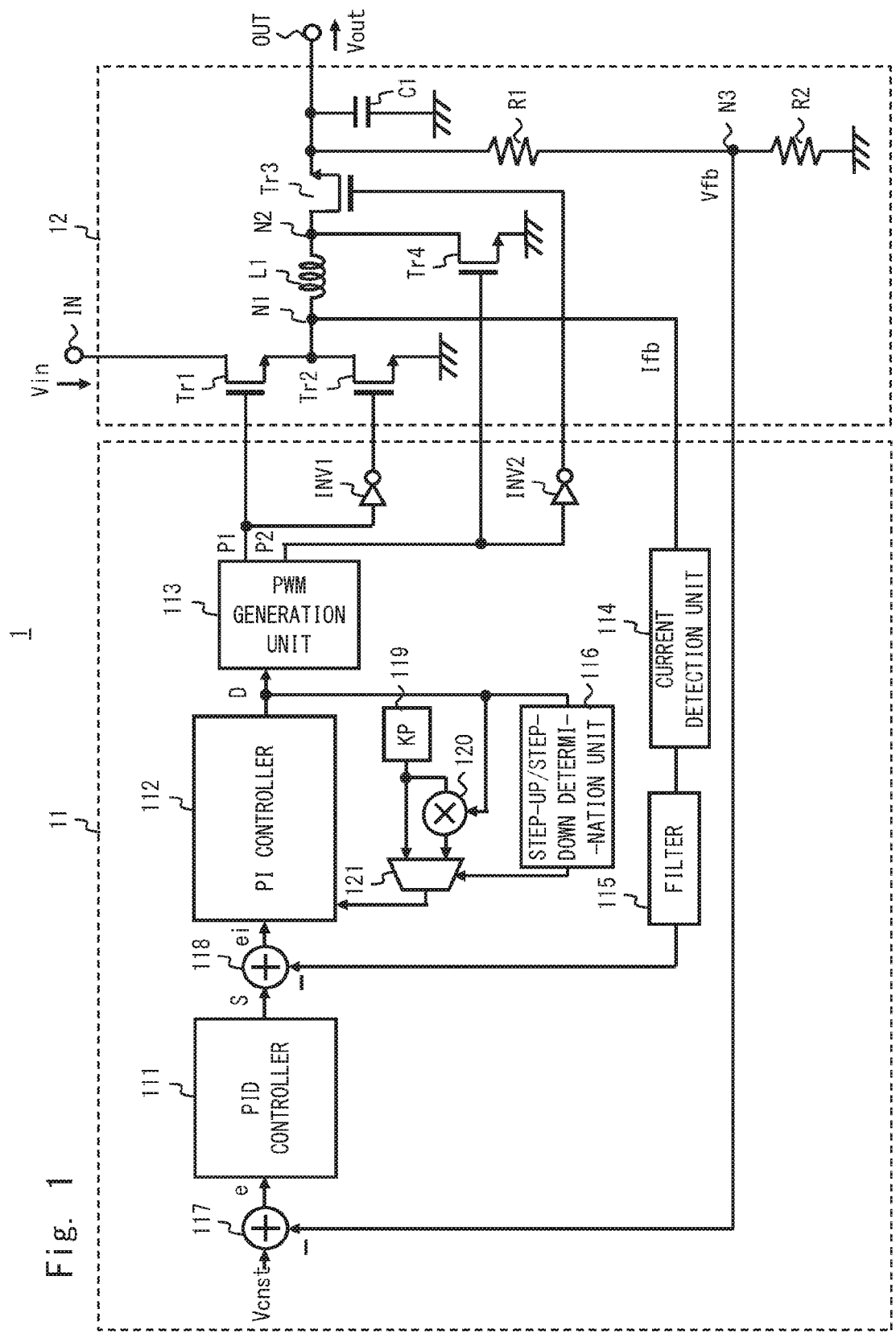
FIG. 1 is a view showing a configuration of a DC-DC converter according to a first embodiment.

FIG. 1 is a view showing a configuration of a DC-DC converter (semiconductor device) 1 according to a first embodiment. The DC-DC converter 1 is mounted on a vehicle and used to supply a stable voltage to an on-vehicle analog product, for example.

As shown in FIG. 1, the DC-DC converter 1 includes a power supply unit 12 and a control unit 11.

(Power Supply Unit 12)

The power supply unit 12 is a part that steps up or steps down an input voltage Vin by the amount of voltage corresponding to a duty ratio of pulse signals P1 and P2 that are supplied from the control unit 11 and thereby generates an output voltage Vout.

Specifically, the power supply unit 12 includes transistors Tr1 to Tr4 that constitute a switching unit, an inductor L1, a capacitor C1, and resistors R1 and R2. In this embodiment, the case where all of the transistors Tr1 to Tr4 are N-channel MOS transistors is described as an example.

In the transistor Tr1, the drain is connected to the input terminal IN, the source is connected to one end (node N1) of the inductor L1, and the pulse signal P1 from the control unit 11 is supplied to the gate. In the transistor Tr2, the drain is connected to the node N1, the source is connected to a ground voltage terminal GND, and an inverted signal of the pulse signal P1 from the control unit 11 is supplied to the gate. Note that the input voltage Vin is supplied to the input terminal N1 from the outside. A ground voltage GND is supplied to the ground voltage terminal GND.

In the transistor Tr3, the source is connected to the output terminal OUT, the drain is connected to the other end (node N2) of the inductor L1, and an inverted signal of the pulse signal P2 from the control unit 11 is supplied to the gate. In the transistor Tr4, the source is connected to the ground voltage terminal GND, the drain is connected the node N2, and the pulse signal P2 from the control unit 11 is supplied to the gate. Note that the output voltage Vout is output from output terminal OUT to the outside (load).

The capacitor C1 is placed between the output terminal OUT and the ground voltage terminal GND. The resistors R1 and R2 are placed in series between the output terminal OUT and the ground voltage terminal GND. Note that a voltage (comparison voltage) Vfb of a node N3 between the resistors R1 and R2 is generated by dividing the output voltage Vout by the resistors R1 and R2 and is fed back to the control unit 11. Further, a current Ifb flowing through the inductor L1 is also fed back from one end (node N1) of the inductor L1 to the control unit 11.

(Basic Operation of Power Supply Unit 12)

The basic operation of the power supply unit 12 is briefly described hereinbelow.

In step-down mode, the transistor Tr3 is fixed to ON, and the transistor Tr4 is fixed to OFF. Then, the transistor Tr1 turns ON and the transistor Tr2 turns OFF first, and thereby a current flows from the input terminal IN to the output terminal OUT through the transistor Tr1 and the inductor L1. Current energy is stored in the inductor L1 at this time. After that, the transistor Tr1 turns OFF and the transistor Tr2 turns ON, and thereby the current that has been flowing from the input terminal IN to the inductor L1 through the transistor Tr1 is shut off. The inductor L1 then releases the stored current energy to the output terminal OUT in order to maintain the current value of the current that has been flowing just before. A current thereby flows from the ground voltage terminal GND to the output terminal OUT through the transistor Tr2. By repeating such an operation, the power supply unit 12 generates the output voltage Vout by stepping down the input voltage Vin by the level corresponding to the duty ratio of the pulse signal P1.

On the other hand, in step-up mode, the transistor Tr1 is fixed to ON, and the transistor Tr2 is fixed to OFF. Then, the transistor Tr4 turns ON and the transistor Tr3 turns OFF first, and thereby a current flows from the input terminal IN to the ground voltage terminal GND through the inductor L1 and the transistor Tr4. Current energy is stored in the inductor L1 at this time. After that, the transistor Tr4 turns OFF and the transistor Tr3 turns ON, and thereby the current that has been flowing from the inductor L1 to the ground voltage terminal GND through the transistor Tr4 is shut off. The inductor L1 then flows the stored current energy to the output terminal OUT in order to maintain the current value of the current that has been flowing just before. By repeating such an operation, the power supply unit 12 generates the output voltage Vout by stepping up the input voltage Vin by the level corresponding to the duty ratio of the pulse signal P2.

In step-up/step-down mode, the operation in step-up mode and the operation in step-down mode are performed in combination.

(Control unit 11)

The control unit 11 is a part that outputs the pulse signals P1 and P2 for controlling the step-up or step-down level of the power supply unit 12.

Specifically, the control unit 11 includes a PID controller (first control unit) 111, a PI controller (second control unit) 112, a PWM generation unit 113, a current detection unit 114, a filter 115, a step-up/step-down determination unit (determination circuit) 116, subtracters 117 and 118, a storage unit 119, a multiplier 120, a selector (first selection circuit) 121, and inverters INV1 and INV2.

The subtracter 117 outputs a difference between a target voltage Vcnst that can be set arbitrarily and a voltage Vfb that is fed back from the power supply unit 12 as a differential signal (first differential signal) e.

The PID controller 111 is a circuit that performs feedback control of the output voltage Vout, and it performs PID control (proportional control, integral control and derivative control) of the differential signal e that is output from the subtracter 117 and outputs a result as a control signal (first control signal) S.

Note that, in the PID controller 111, proportional control, integral control and derivative control on the differential signal e are respectively performed based on the following expressions (1), (2) and (3), where NP indicates a reference proportionality constant, KI indicates an integral constant, KD indicates derivative constant, and t indicates time.

Proportional control: KP×e(t)  (1)

Integral control: KI×∫e(t)dt  (2)

Derivative control: KD×de(t)dt  (3)

Then, the PID controller 111 adds up results of performing proportional control, integral control and derivative control on the differential signal e and outputs a result of the addition as the control signal S.

The current detection unit 114 detects an average current Ifb that flows through the inductor L1 from one end (node N1) of the inductor L1. The current Ifb is rectified by the filter 115.

The subtracter 118 outputs a difference between the control signal S that is output from the PID controller 111 and the current Ifb that is fed back from the power supply unit 12 as a differential signal (second differential signal) ei.

The PI controller 112 is a circuit that performs feedback control of the average current Ifb that flows through the inductor L1, and it performs PI control (proportional control and integral control) of the differential signal ei that is output from the subtracter 118 and outputs a result as a control signal (second control signal) D.

In step-down mode, which is, when input voltage Vin≥output voltage Vout is satisfied, the average current Ifb that flows through the inductor L1 is proportional to the input voltage Vin. Thus, if no measures are taken, the bandwidth of the current loop for feedback control of the current flowing through the inductor L1 is also proportional to the input voltage Vin, which makes it difficult to increase the bandwidth of the current loop. Thus, the inventor of the present invention has focused attention on the fact that the control signal D is inversely proportional to the input voltage Vin in step-down mode and employed a configuration of performing proportional control of the differential signal ei by using a proportionality constant obtained by multiplying the reference proportionality constant KP by the control signal D. Thus, in the DC-DC converter 1, the dependence of the bandwidth of the current loop on the input voltage is canceled out in step-down mode, and it is thereby possible to generate the stable output voltage Vout without depending on the level of the input voltage Vin. Note that, in step-up mode, the bandwidth of the current loop does not have the dependence on the input voltage.

To be specific, the step-up/step-down determination unit 116 determines whether the power supply unit 12 is in step-up mode or in step-down mode based on the control signal D that is output from the PI controller 112. The multiplier 120 multiplies the reference proportionality constant KP stored in the storage unit 119 by the control signal D and outputs a result KP×D. The selector 121 selects and outputs any one of the reference proportionality constant KP and the multiplication result KP×D based on a determination result of the step-up/step-down determination unit 116. For example, when the step-up/step-down determination unit 116 determines that it is in step-up mode (or in step-up/step-down mode), the selector 121 selects and outputs the reference proportionality constant KP. On the other hand, when the step-up/step-down determination unit 116 determines that it is in step-down mode, the selector 121 selects and outputs the multiplication result KP×D.

The output result of the selector 121 is used as a proportionality constant for proportional control by the PI controller 112. Specifically, the PI controller 112 performs proportional control of the differential signal ei by using the reference proportionality constant KP as a proportionality constant in step-up mode, and performs proportional control of the differential signal ei by using the multiplication result KP×D as a proportionality constant in step-down mode.

Note that, in the PI controller 112, proportional control and integral control on the differential signal ei are performed based on the following expressions (4) and (5), respectively.

Proportional control: (in step-up mode): KP×ei(t) (in step-down mode): KP×D×ei(t)  (4)

Integral control: KI×∫ei(t)dt  (5)

Then, the PI controller 112 adds up results of performing proportional control and integral control on the differential signal ei and outputs a result of the addition as the control signal D.

The PWM generation unit 113 generates pulse signals P1 and P2 with a duty ratio according to the control signal D. The pulse signal P1 is supplied to the gate of the transistor Tr1 in the power supply unit 12, and is also inverted by the inverter INV1 and supplied to the gate of the transistor Tr2 in the power supply unit 12. The pulse signal P2 is supplied to the gate of the transistor Tr4 in the power supply unit 12, and is also inverted by the inverter INV2 and supplied to the gate of the transistor Tr3 in the power supply unit 12.

As described above, in the DC-DC converter 1 according to this embodiment, in step-down mode, proportional control is performed on the differential signal ei (current loop) using a proportionality constant multiplied by the control signal D that is inversely proportional to the input voltage Vin. The DC-DC converter 1 can thereby cancel out the dependence of the bandwidth of the current loop on the input voltage in step-down mode, and it is thereby possible to increase the bandwidth of the current loop all over the range of the input voltage. Further, with an increase in the bandwidth of the current loop, it is also possible to increase the bandwidth of the voltage loop for feedback control of the output voltage Vout. Consequently, the DC-DC converter 1 can generate the stable output voltage Vout without depending on the level of the input voltage Vin. In other words, it is possible to improve the line transient characteristic and the load transient characteristic.

Although the case where the DC-DC converter 1 is a step-up/step-down type is described as an example in this embodiment, it is not limited thereto, and any type of converter may be used as long as it at least has a function of stepping down a voltage.

Further, the PID controller 111 may be replaced with a PI controller that performs proportional control and integral control only.

Further, the PI controller 112 may be replaced with a PID controller that performs derivative control in addition to proportional control and integral control.

Further, the PI controller 112 may perform not only proportional control using a proportionality constant multiplied by the control signal D but also integral control using an integral constant multiplied by the control signal D in step-down mode. Furthermore, in the case where the PI controller 112 is replaced with a PID controller, it may perform derivative control using a derivative constant multiplied by the control signal D in step-down mode.

Second Embodiment

Figure 2:
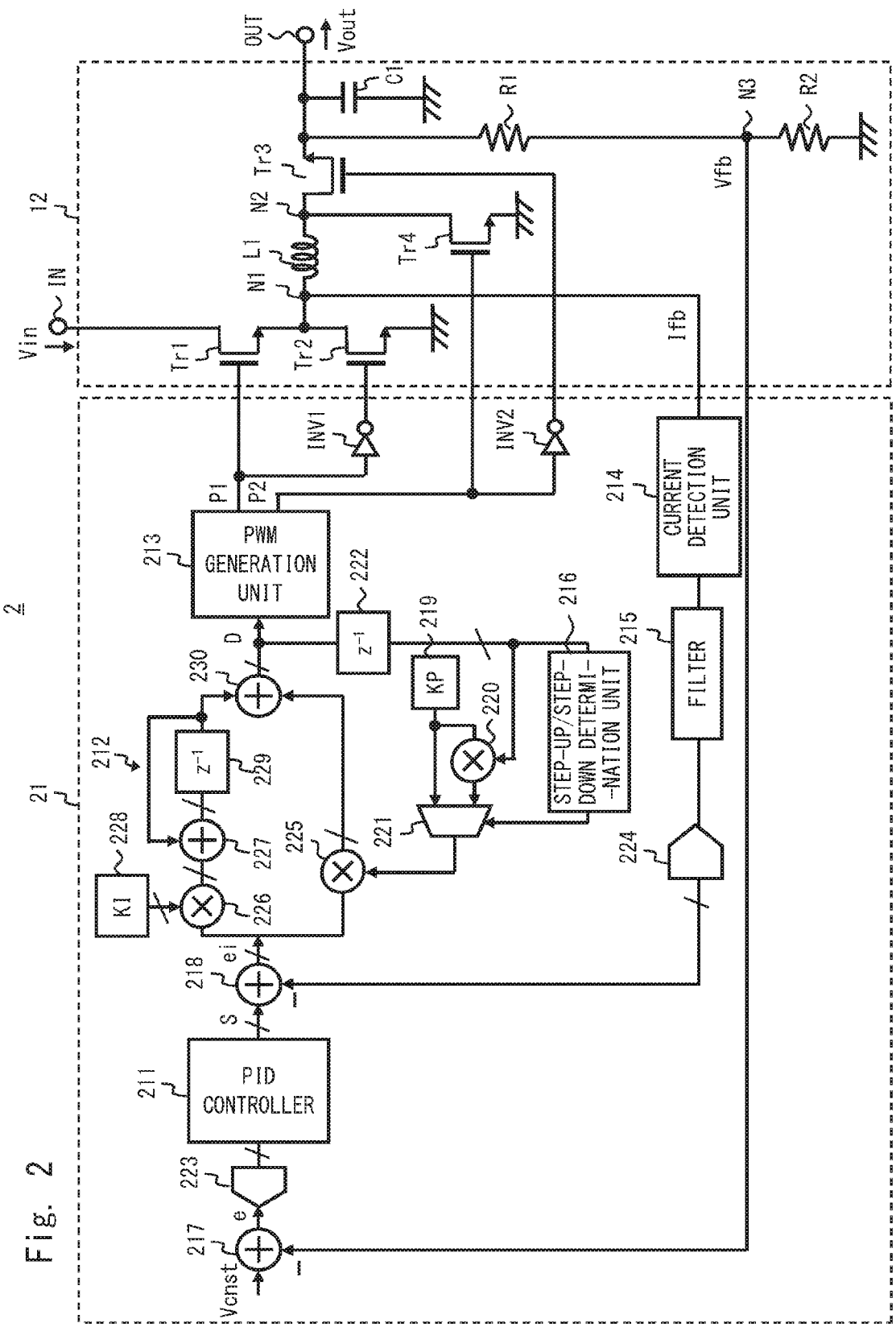
FIG. 2 is a view showing a configuration of a DC-DC converter according to a second embodiment.

FIG. 2 is a view showing a configuration of a DC-DC converter 2 according to a second embodiment.

As shown in FIG. 2, the DC-DC converter 2 is a digital-control DC-DC converter, and it includes a control unit 21 in place of the control unit 11.

The control unit 21 includes a PID controller 211, a PI controller 212, a PWM generation unit 213, a current detection unit 214, a filter 215, a step-up/step-down determination unit 216, subtracters 217 and 218, a storage unit 219, a multiplier 220, a selector 221, inverters INV1 and INV2, a flip-flop 222, and A-D converters 223 and 224.

Note that the PID controller 211, the PI controller 212, the PWM generation unit 213, the current detection unit 214, the filter 215, the step-up/step-down determination unit 216, the subtracters 217 and 218, the storage unit 219, the multiplier 220, the selector 221 and the inverters INV1 and INV2 in the control unit 21 respectively correspond to the PID controller 111, the PI controller 112, the PWM generation unit 113, the current detection unit 114, the filter 115, the step-up/step-down determination unit 116, the subtracters 117 and 118, the storage unit 119, the multiplier 120, the selector 121 and the inverters INV1 and INV2 in the control unit 11.

FIG. 2 shows a detailed configuration of the PI controller 212. Specifically, the PI controller 212 includes multipliers 225 and 226, adders 227 and 230, a storage unit 228, and a flip-flop 229.

The A-D converter 223 converts the differential signal e that is output from the subtracter 217 from analog to digital and outputs a result. The PID controller 211 performs PID control of the digital differential signal e and outputs a result as a digital control signal S. The A-D converter 224 converts the average current Ifb that flows through the inductor L1 that is output from the filter 215 from analog to digital and outputs a result. The subtracter 218 outputs a difference between the digital control signal S and the digital current signal representing the average current Ifb as a digital differential signal ei.

The flip-flop 222 latches the control signal (digital code) D in synchronization with the rising edge of a clock signal and outputs it as a control signal Dz. Note that the flip-flop 222 may have any structure as long as it delays the control signal D by one clock cycle and then outputs it.

The multiplier 220 multiplies the reference proportionality constant KP stored in the storage unit 219 by the control signal (digital code) Dz and outputs a result KP×Dz. The selector 221 selects and outputs any one of the reference proportionality constant KP and the multiplication result KP×Dz based on a determination result of the step-up/step-down determination unit 216.

The step-up/step-down determination unit 216 determines whether the power supply unit 12 is in step-up mode, in step-down mode, or in step-up/step-down mode based on the control signal Dz. For example, the step-up/step-down determination unit 216 outputs a determination result with a value 0 indicating step-down mode when the control signal Dz, which is a 6-bit digital code, indicates 0 to 31 in decimal notation, and outputs a determination result with a value 1 indicating step-up mode or step-up/step-down mode when the control signal Dz indicates 32 to 63 in decimal notation. Thus, when the step-up/step-down determination unit 216 outputs a determination result with a value 0, the selector 221 selects and outputs the multiplication result KP×Dz, and when the step-up/step-down determination unit 216 outputs a determination result with a value 1, the selector 221 selects and outputs the reference proportionality constant KP.

In the PI controller 212, the multiplier 225 forms a circuit that performs proportional control of the differential signal ei, and it outputs a result of multiplying the differential signal ei by the output of the selector 221. Specifically, the multiplier 225 multiplies the differential signal ei by the reference proportionality constant KP and outputs a result in step-up mode (or in step-up/step-down mode), and multiplies the differential signal ei by the multiplication result KP×Dz and outputs a result in step-down mode.

Further, in the PI controller 212, the multiplier 226, the storage unit 228, the adder 227 and the flip-flop 229 form a circuit that performs integral control of the differential signal ei. The multiplier 226 outputs a result of multiplying the differential signal ei by the integral constant KI stored in the storage unit 228. The adder 227 adds up a result of multiplication by the multiplier 226 and data latched by the flip-flop 229 and outputs it. The flip-flop 229 latches and outputs the output of the adder 227. Thus, a result of multiplication of the differential signal ei by the integral constant KI is integrated by the adder 227 and the flip-flop 229.

Then, in the PI controller 212, the adder 230 adds up the output of the multiplier 225 (a result of proportional control) and the output of the flip-flop 229 (a result of integral control) and outputs it as the control signal (digital code) D.

The other configuration and operation of the DC-DC converter 2 are basically the same as those of the DC-DC converter 1 and thus not redundantly described.

As described above, in the DC-DC converter 2 according to this embodiment, in step-down mode, proportional control is performed on the differential signal ei (current loop) using a proportionality constant multiplied by the control signal Dz that is inversely proportional to the input voltage Vin. The DC-DC converter 2 can thereby cancel out the dependence of the bandwidth of the current loop on the input voltage in step-down mode, and it is thereby possible to increase the bandwidth of the current loop all over the range of the input voltage. Further, with an increase in the bandwidth of the current loop, it is also possible to increase the bandwidth of the voltage loop. Consequently, the DC-DC converter 2 can generate the stable output voltage Vout without depending on the level of the input voltage Vin. In other words, it is possible to improve the line transient characteristic and the load transient characteristic.

Although the case where the DC-DC converter 2 is a step-up/step-down type is described as an example in this embodiment, it is not limited thereto, and any type of converter may be used as long as it at least has a function of stepping down a voltage.

Further, the PID controller 211 may be replaced with a PI controller that performs proportional control and integral control only.

Further, the PI controller 212 may be replaced with a PID controller that performs derivative control in addition to proportional control and integral control.

Further, the PI controller 212 may perform not only proportional control using a proportionality constant multiplied by the control signal Dz but also integral control using an integral constant multiplied by the control signal Dz in step-down mode. Furthermore, in the case where the PI controller 212 is replaced with a PID controller, it may perform derivative control using a derivative constant multiplied by the control signal Dz in step-down mode.

Third Embodiment

Figure 3:
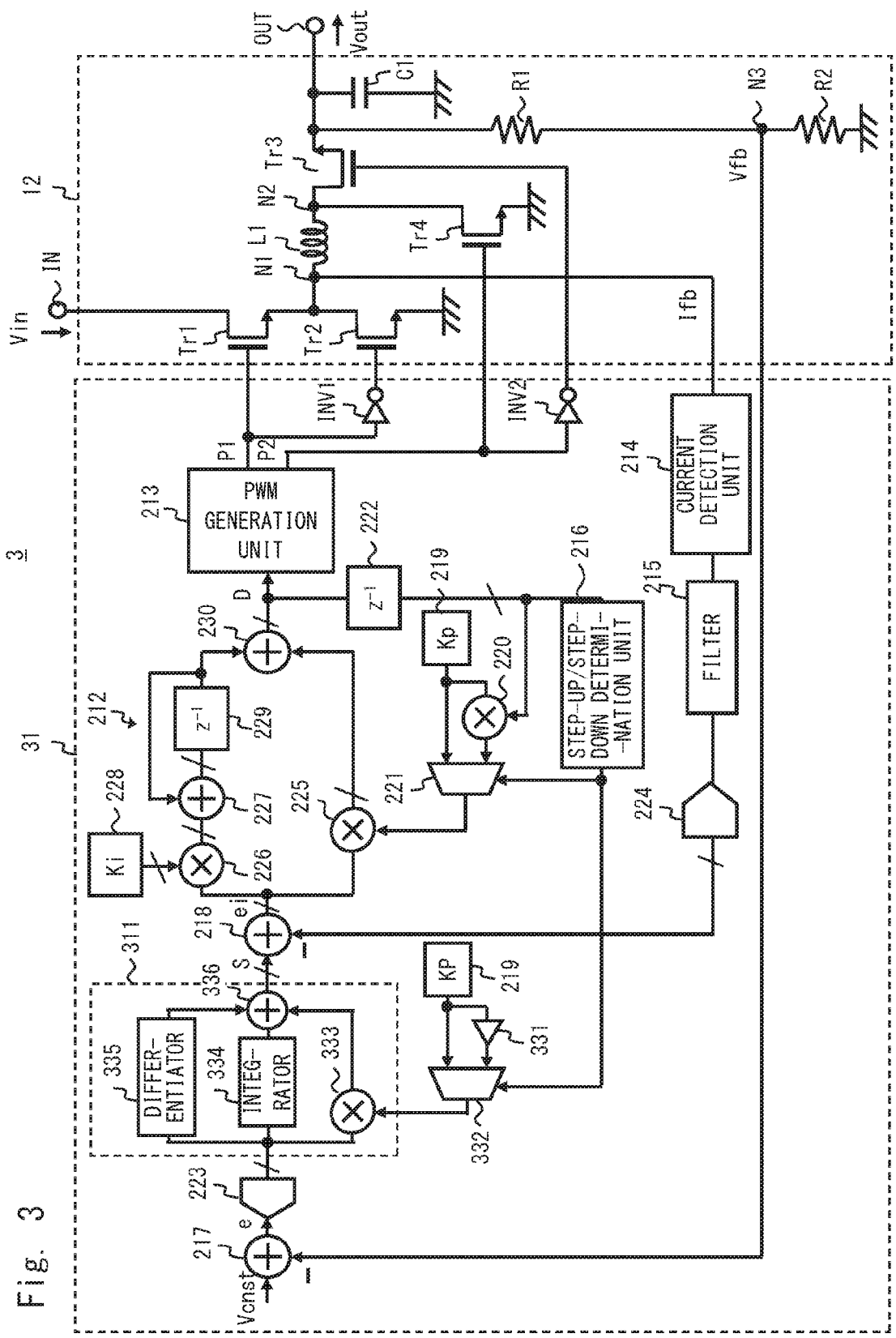
FIG. 3 is a view showing a configuration of a DC-DC converter according to a third embodiment.

FIG. 3 is a view showing a configuration of a DC-DC converter 3 according to a third embodiment.

As shown in FIG. 3, the DC-DC converter 3 is a digital-control DC-DC converter, and it includes a control unit 31 in place of the control unit 21.

The control unit 31 includes a PID controller 311 in place of the PID controller 211, and further includes a gain unit 331 and a selector (second selection. circuit.) 332.

FIG. 3 shows a detailed configuration of the PID controller 311. Specifically, the PID controller 311 includes a multiplier 333, an integrator 334, a differentiator 335, and an adder 336.

The gain unit 331 amplifies (multiplies) the reference proportionality constant KP that is stored in the storage unit 219 by a specified gain and outputs a result. The selector 332 selects and outputs any one of the reference proportionality constant KP and the output of the gain unit 331 (a proportionality constant obtained by amplifying the reference proportionality constant KP) based on a determination result of the step-up/step-down determination unit 216.

In the PID controller 311, the multiplier 333 forms a circuit that performs proportional control of the differential signal e, and it outputs a result of multiplying the differential signal e by the output of the selector 332. Specifically, the multiplier 333 multiplies the differential signal e by the reference proportionality constant KP and outputs a result in step-up mode (or in step-up/step-down mode), and multiplies the differential signal e by the proportionality constant obtained by amplifying the reference proportionality constant KP and outputs a result in step-down mode.

Further, in the PID controller 311, the integrator 334 performs integral control of the differential signal e, and the differentiator 335 performs derivative control of the differential signal e. Then, the adder 336 adds up the output of the multiplier 333 (a result of proportional control), the output of the integrator 334 (a result of integral control) and the output of the differentiator 335 (a result of derivative control), and outputs a result of the addition as the control signal S.

The other configuration and operation of the DC-DC converter 3 are basically the same as those of the DC-DC converter 2 and thus not redundantly described.

In step-up mode, there is a possibility that RHPZ (Right Half Plane Zero) occurs in the power supply unit 12, and in this case, the bandwidth of the voltage loop is limited by the RHPZ frequency. As a result, the bandwidth of the voltage loop is limited also in step-down mode. In view of this, in the DC-DC converter 3 according to this embodiment, the PID controller 311 performs proportional control by using a proportionality constant that is amplified by a specified gain in step-down mode. The DC-DC converter 3 can thereby prevent reduction of the bandwidth of the voltage loop in step-down mode.

As described above, the DC-DC converter 3 according to this embodiment has substantially the same advantageous effects as the DC-DC converter 2 according to the second embodiment. Additionally, in the DC-DC converter 3, the DID controller 311 performs proportional control by using a proportionality constant that is amplified by a specified gain in step-down mode. The DC-DC converter 3 can thereby prevent reduction of the bandwidth of the voltage loop in step-down mode.

Although the case where the DC-DC converter 3 is a step-up/step-down type is described as an example in this embodiment, it is not limited thereto, and any type of converter may be used as long as it at least has a function of stepping down a voltage.

Further, the DID controller 311 may be replaced with a PI controller that performs proportional control and integral control only.

Further, the PID controller 311 may perform not only proportional control using a proportionality constant amplified by a specified gain but also integral control and derivative control using an integral constant and a derivative constant amplified by a specified gain as well in step-down mode.

Fourth Embodiment

Figure 4:
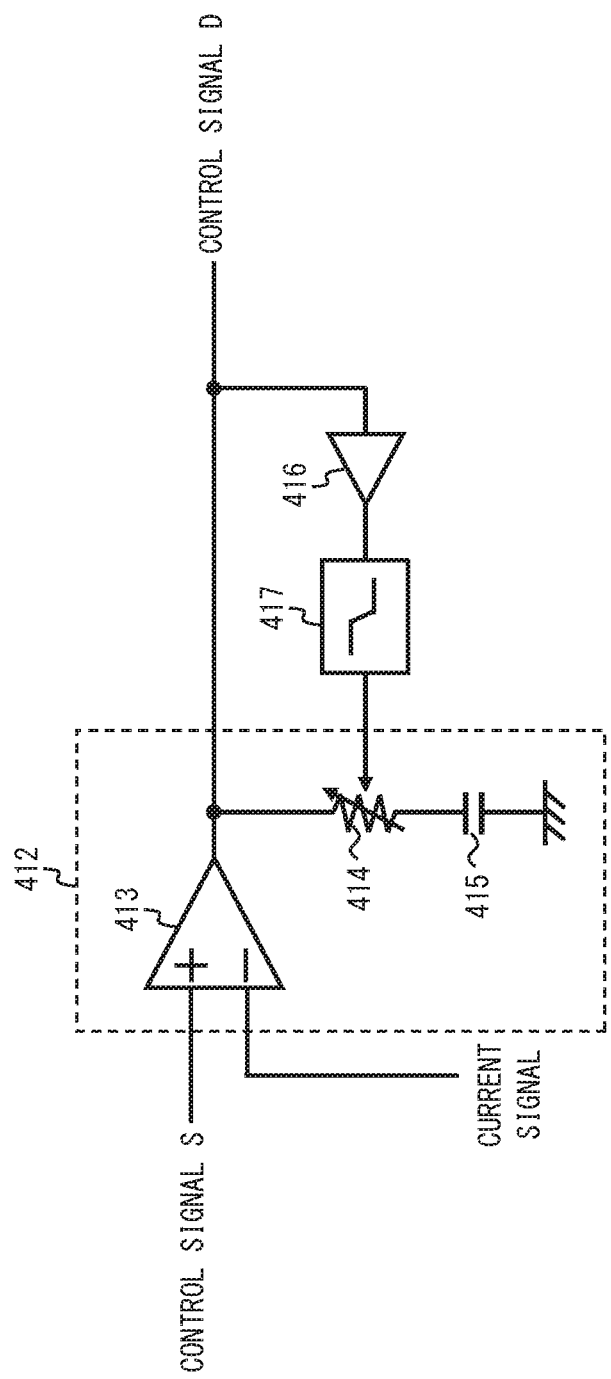
FIG. 4 is a view showing a part of a configuration of a DC-DC converter according to a fourth embodiment.

FIG. 4 is a view showing a part of a configuration of a DC-DC converter 4 according to a fourth embodiment.

The DC-DC converter 4 is as analog-control DC-DC converter.

Note that FIG. 4 shows only the part corresponding to the PI controller 112 in FIG. 1 and a feedback path of the control signal D. Specifically, FIG. 4 shows a PI controller 412 and a buffer 416 and a limiter 417 that are placed on the feedback path of the control signal D.

The PI controller 412 includes an amplifier 413, a variable resistor 414, and a capacitor 415. The amplifier 413 amplifiers a potential difference between the control signal S that is output from the PID controller 211 and the current signal indicating the average current Ifb that flows through the inductor L1 and outputs it as the control signal D. The variable resistor 414 and the capacitor 415 are placed in series between the output of the amplifier 413 and the ground voltage terminal GND. A resistance value of the variable resistor 414 is controlled by the control signal D that is fed back through the buffer 416 and the limiter 417.

A proportionality constant that is used for proportional control by the PI controller 412 is determined by the resistance value of the variable resistor 414. Accordingly, by controlling the resistance value of the variable resistor 414 by the control signal D that is inversely proportional to the input voltage Vin, the DC-DC converter 4 can cancel out the dependence of the bandwidth of the current loop on the input voltage in step-down mode. It is thereby possible to increase the bandwidth of the current loop all over the range of the input voltage. Further, with an increase in the bandwidth of the current loop, it is also possible to increase the bandwidth of the voltage loop. Consequently, the DC-DC converter 4 can generate the stable output voltage Vout without depending on the level of the input voltage Vin. In other words, it is possible to improve the line transient characteristic and the load transient characteristic.

Although embodiments of the present invention are described specifically in the foregoing, the present invention is not restricted to the above-described embodiments, and various changes and modifications may be made without departing from the scope of the invention.

For example, in the semiconductor device according to the above embodiment, the conductivity type (P type or N type) of a semiconductor substrate, a semiconductor layer, a diffusion layer (diffusion region) and the like may be inverted. Accordingly, when one conductivity type of N type and P type is a first conductivity type and the other conductivity type thereof is a second conductivity type, the first conductivity type may be P type and the second conductivity type may be N type, or the first conductivity type may be N type and the second conductivity type may be P type on the contrary.

The first to fourth embodiments can be combined as desirable by one of ordinary skill in the art.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

What is claimed is:

1. A semiconductor device comprising:
    a power supply unit that includes an inductor and a switching unit turning on and off under control by a pulse signal to control a current flowing through the inductor, and generates an output voltage by changing an input voltage by an amount of voltage corresponding to a duty ratio of the pulse signal;
    a first control unit that performs PI control of a first differential signal being a difference between a comparison voltage corresponding to the output voltage and a target voltage and outputs a first control signal;
    a second control unit that performs PI control of a second differential signal being a difference between the first control signal and a current signal indicating an average value of the current flowing through the inductor and outputs a second control signal; and
    a PWM generation unit that generates the pulse signal with a duty ratio corresponding to the second control signal, wherein
    in step-down mode, the second control unit performs proportional control of the second differential signal by using a multiplication result of multiplying the second control signal by a reference proportionality constant as a proportionality constant.

2. The semiconductor device according to claim 1, wherein, in step-up mode, the second control unit performs proportional control of the second differential signal by using the reference proportionality constant as a proportionality constant.

3. The semiconductor device according to claim 2, further comprising:
    a determination circuit that determines whether it is in step-down mode or in step-up mode; and
    a first selection circuit that selects and outputs any one of the multiplication result and the reference proportionality constant based on a determination result of the determination circuit, wherein
    the second control unit performs proportional control of the second differential signal by using an output result of the first selection circuit as a proportionality constant.

4. The semiconductor device according to claim 3, wherein the second control unit is a PI controller that performs proportional control of the second differential signal by using an output result of the first selection circuit as a proportionality constant and further performs integral control of the second differential signal and outputs the second control signal.

5. The semiconductor device according to claim 3, further comprising:
    a second selection circuit that selects and outputs any one of the reference proportionality constant and a constant obtained by amplifying the reference proportionality constant by a specified gain based on a determination result of the determination circuit, wherein
    the first control unit performs proportional control of the first differential signal by using an output result of the second selection circuit as a proportionality constant.

6. The semiconductor device according to claim 1, wherein the second control unit is a PI controller that performs, in step-down mode, proportional control of the second differential signal by using the multiplication result as a proportionality constant and further performs integral control of the second differential signal and outputs the second control signal.

7. The semiconductor device according to claim 1, wherein the second control unit includes:
    an amplifier that amplifies a potential difference between the second control signal being an analog signal and the current signal being an analog signal and outputs the second control signal;
    a capacitor that is placed between an output terminal of the amplifier and a ground voltage terminal; and
    a variable resistor that is placed between the output terminal of the amplifier and the capacitor and has a resistance value varying according to the second control signal.

8. A control method of a semiconductor device that controls a current flowing through an inductor by a pulse signal and thereby generates an output voltage by changing an input voltage by an amount of voltage corresponding to a duty ratio of the pulse signal, the method comprising:
    performing PI control of a first differential signal being a difference between a comparison voltage corresponding to the output voltage and a target voltage and outputting a first control signal;
    in step-down mode, performing proportional control of a second differential signal being a difference between the first control signal and a current signal indicating an average value of the current flowing through the inductor by using a multiplication result of multiplying a second control signal by a reference proportionality constant as a proportionality constant, and performing integral control of the second differential signal and outputting the second control signal; and
    generating the pulse signal with a duty ratio corresponding to the second control signal.

9. The control method of a semiconductor device according to claim 8, comprising:
    in step-up mode, performing proportional control of the second differential signal by using the reference proportionality constant as a proportionality constant and further performing integral control of the second differential signal and outputting the second control signal.

10. The control method of a semiconductor device according to claim 9, comprising:
    determining whether it is in step-down mode or in step-up mode;
    selecting any one of the multiplication result and the reference proportionality constant based on a result of the determination; and
    performing proportional control of the second differential signal by using the selected one as a proportionality constant.

* * * * *